US007039237B2

(12) United States Patent
Watkins et al.

(10) Patent No.: US 7,039,237 B2
(45) Date of Patent: May 2, 2006

(54) METHOD AND SYSTEM FOR PREVENTING ABDUCTION OF A PERSON

(75) Inventors: Peyton C. Watkins, Penfield, NY (US); Thomas M. Stephany, Churchville, NY (US); Dana W. Wolcott, Honeoye Falls, NY (US); Donald E. Olson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 730 days.

(21) Appl. No.: 10/271,389

(22) Filed: Oct. 14, 2002

(65) Prior Publication Data

US 2004/0071321 A1 Apr. 15, 2004

(51) Int. Cl.
*G06K 9/00* (2006.01)

(52) U.S. Cl. ...................................... 382/218; 382/115

(58) Field of Classification Search ................ 348/156, 348/152

See application file for complete search history.

(56) References Cited

U.S. PATENT DOCUMENTS

| | | | | |
|---|---|---|---|---|
| 6,654,047 | B1 * | 11/2003 | Iizaka | 348/143 |
| 6,744,462 | B1 * | 6/2004 | Gutta et al. | 348/143 |
| 2002/0067856 | A1 * | 6/2002 | Fujii et al. | 382/218 |
| 2004/0001142 | A1 * | 1/2004 | Kumhyr | 348/143 |

* cited by examiner

*Primary Examiner*—Mark Zimmerman
*Assistant Examiner*—Robert Tarcu
(74) *Attorney, Agent, or Firm*—Peyton C. Watkins

(57) ABSTRACT

A method for preventing abduction of a person, the method includes the steps of capturing a first image of a first adult and a first person upon entering a premises; inputting the captured first image in a database; capturing a second image of a second adult and a second person upon exiting the premises; and comparing the first and second images for predetermined characteristics for validating that the first adult associated with the first person in the first image is the same as the second adult associated with the second person in the second image.

10 Claims, 4 Drawing Sheets

METHOD AND SYSTEM FOR PREVENTING ABDUCTION OF A PERSON

FIELD OF THE INVENTION

The invention relates generally to the field of infoimaging and, more particularly, to using infoimaging to assist in the prevention of child abduction.

BACKGROUND OF THE INVENTION

Unfortunately, in today's society, child abduction is becoming rampant and problematic such that sometimes intrusive protections for the sake of child welfare is adopted. This is evident in the use of video surveillance cameras in parking lots, malls and the like. Businesses such as Wal-Mart of Benton, Ark. have action plans to deal with abductions which might take place upon their premises. Additionally, businesses such as Chuck-E-Cheese™ child entertainment centers have safeguards in place to ensure the safety of children that enter their establishments. Their method is to manually stamp hands of people entering with like identification (such as an identification number only visible under UV light), and manually checking that persons leaving with a child have the same identification as the adult. Likewise, adults with intellectual development disabilities also need protection in that their mental state often causes confusion and their possible unauthorized removal from an area or premises.

Although the above methods are satisfactory, they have drawbacks. First, the methods are manual that obviously introduces human error in the identification process. Further, the cost of staffing a person strictly for identification is costly and relatively unreliable. Also, in the case of abduction, there is no evidentiary record of the suspect. Obviously, a business or system which possesses such an evidentiary record would cause hesitancy on the part of an abductor to actually commit the act of kidnapping.

Consequently, a need exits for a method that is automatic and reliable, and also which creates an evidentiary record of a suspect in the unfortunate event of abduction.

SUMMARY OF THE INVENTION

The present invention is directed to overcoming one or more of the problems set forth above. Briefly summarized, according to one aspect of the present invention, the present invention relates to a method for preventing abduction of a person, the method comprising the steps of: (a) capturing a first image of a first adult and a first person upon entering a premises; (b) inputting the captured first image in a database; (c) capturing a second image of a second adult and a second person upon exiting the premises; and (d) comparing the first and second images for predetermined characteristics for validating that the first adult associated with the first person in the first image is the same as the second adult associated with the second person in the second image.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of being automatic in the identification of persons entering and leaving a premises. Additionally, the method provides evidentiary records of activities at the premises that discourage acts of kidnapping.

DETAILED DESCRIPTION OF THE INVENTION

Figure 1:
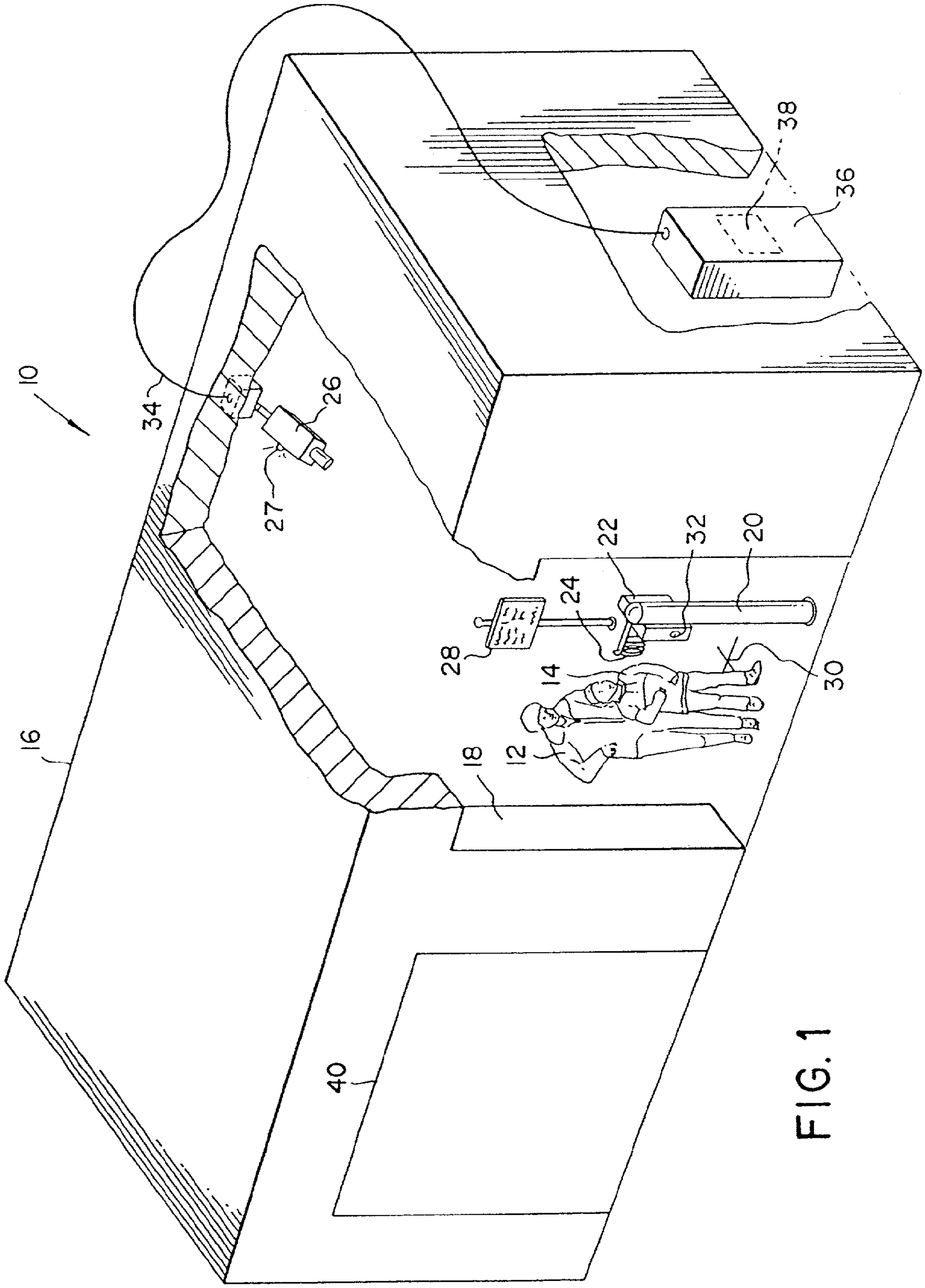
FIG. 1 is a perspective view of the entrance to premises that includes the automatic identification of persons.

Referring to FIG. 1, detailed is a drawing of the entrance to premises 10, showing an adult 12 with child 14 entering building 16 through doorway 18. Upon entering doorway 18, the adult 12 and child 14 encounter a post 20 holding a dispenser 22 that contains a plurality of bracelets 24 having identification numbers thereon. Although numbers are used, any identification means may be used. Upon entering the premises 10, the adult 12, preferably, inputs the number of bracelets 24 needed for their party, two in this instance. The adult 12 and child 14 each take a bracelet 24 having the exact same ID from the dispenser 22 and place them around their wrist or the like. It should be noted at this point that these bracelets also contain RF ID or the like assigned by dispenser 22. The withdrawal of the ID bracelets 24 prompts a camera 26, preferably digital, to capture an image of the party in a designated time period, 10 seconds for instance. The withdrawal of the bracelet 24 also prompts its unique ID to be associated with the upcoming image to be captured so that there is linkage between the image and the bracelet. A sign 28 informs the party that an image will be captured in ten seconds upon withdrawal of the bracelet 24 so that all persons in the party are facing the camera 26. The sign 28 also informs the party of a designated location, preferably marked by some indicator 30 on the floor, so that the camera 26 is properly focused. Alternatively, the adult 12 may push a button 32 on the dispenser 22 for capturing the image so that the parties are facing the camera 26 and in the designated location 30 indicated upon the floor.

After image capture, the digital image is sent via a cable 34 by camera 26 to a computer 36 having a database 38 for storage of the image. If the image is originally captured as an AgX image, the image is digitized before storage, such digitization is well known in the art and will not be discussed herein.

Figure 2:
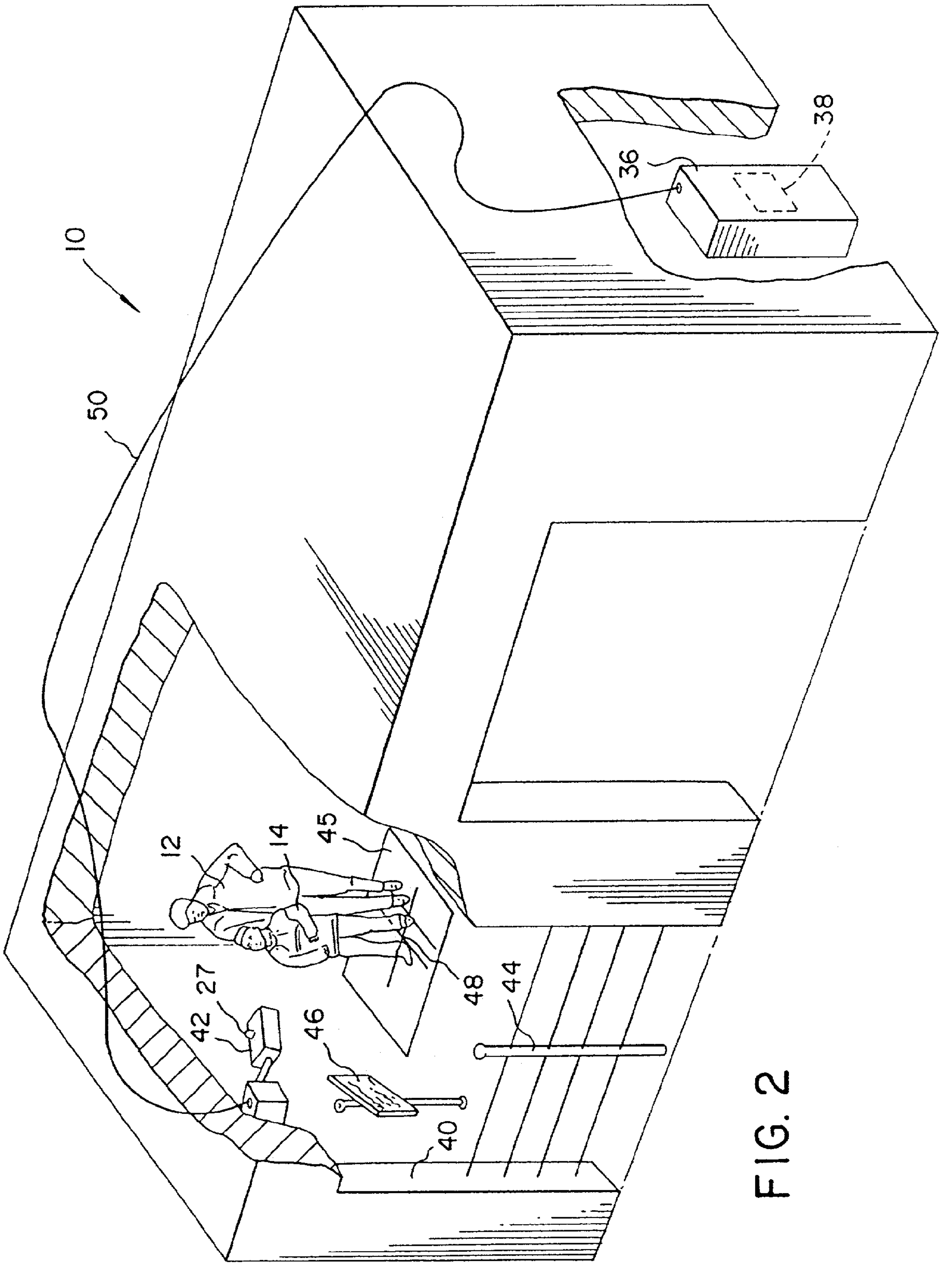
FIG. 2 is a perspective view of the exit to premises that includes the automatic identification of persons.

The premises also include an exit 40 that will be discussed in detail in FIG. 2. Now referring to FIG. 2, there is shown the premise 10 having a second camera 42 that captures an image of the exiting party. It is instructive to note that the exit 40 is blocked by a mechanism 44 from exiting until proper identification of the party. Image capture is initiated by some sensing mechanism such as a mat sensor 45. Second sign 46 instructs adult 12 and child 14 to stand upon second mark 48 (i.e., the mat sensor 45) wherein a second digital image is captured. This image is sent to computer 36 via second camera 42 and cable 50 to be likewise stored in database 38. These first and second digital images, being linked by like ID numbers are next compared to each other by a system such as automatic facial recognition. The linking of the images is accomplished by the RF ID of the bracelet 24 being sensed by a sensor 27 mounted upon both the first camera 26 and second camera 42, respectively upon entering and exiting. Such facial recognition programs are well known in the art and will not be discussed herein. These faces, being deemed alike, signal mechanism 44 to allow exit from premises 10. Alternatively, in lieu of an exit-blocking mechanism 44, there is no per se exit-blocking mechanism, and the group of persons is permitted to exit the premise. In this case, the second camera 42 captures an image for archival purposes so that law-enforcement officials or the like may view the image if necessary.

In addition, upon capture of the image by the second camera 42, the database 38 contains images of known abductors and the like. The computer 36 then compares the images of known abductors to the image of the exiting group via facial recognition programs to verify if a known abductor is present in the group. The group may or may not be permitted to exit via the mechanisms described hereinabove.

Figure 3:
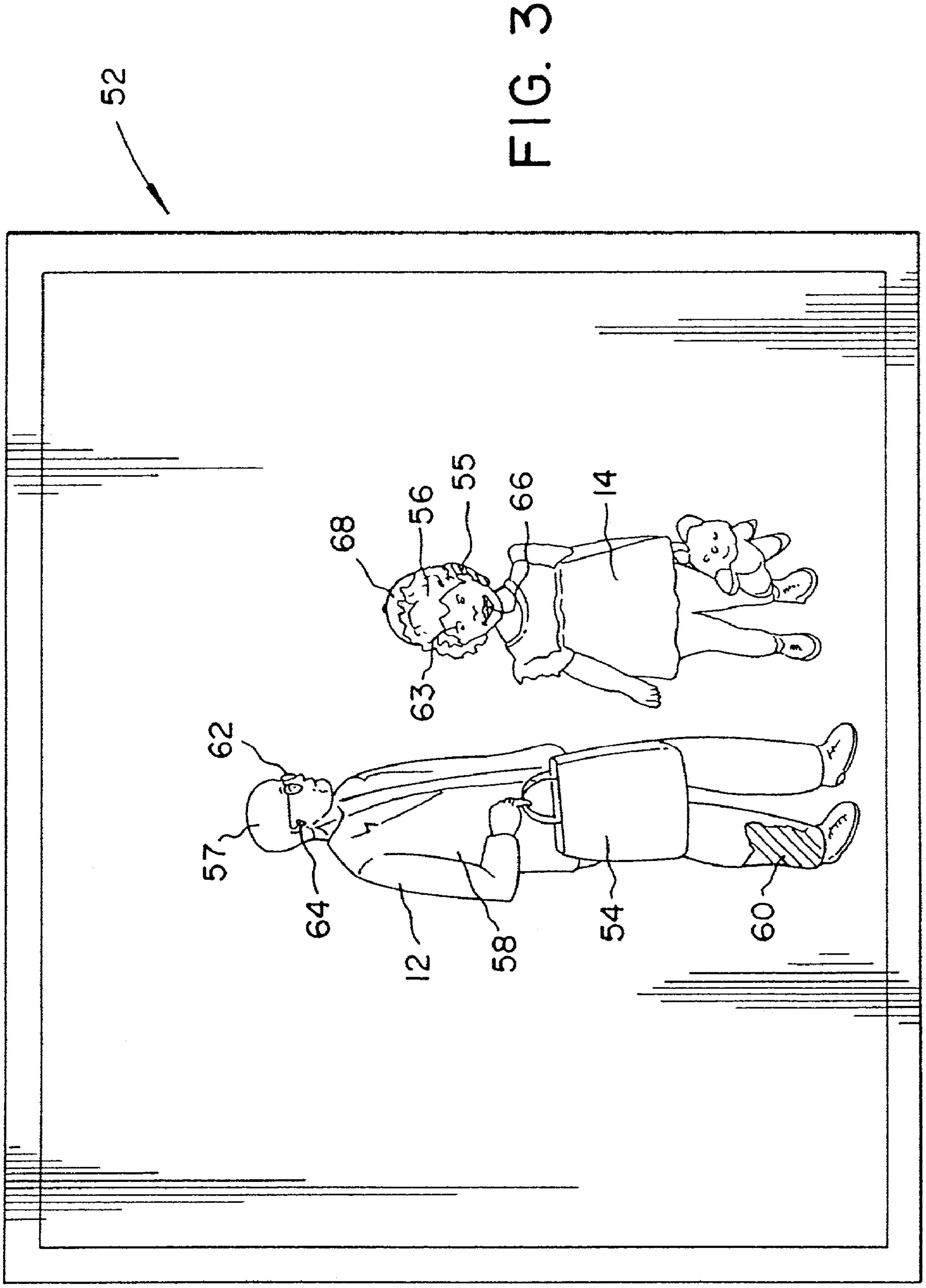
FIG. 3 is a drawing of an image detailing an adult and child along with personal features useable for purposes of identification.

Referring next to FIG. 3, a captured image 52 is shown having the adult 12 holding a shopping bag 54 and the child 14. As illustrated therein, the adult and child have specific hair colors 55 (shown in cross-hatch) or absence thereof, hair texture 56 or lack thereof (bald 57), specific clothing 58 or clothing colors 60, glasses 62 or absence thereof 63, hearing aids 64 or absence thereof, braces 66 or absence thereof, and/or hats 68 or absence thereof. Such features are recognized by a Bayes Classifier in the computer 36 which is input with data for recognizing such features as is well known in the art.

Figure 4:
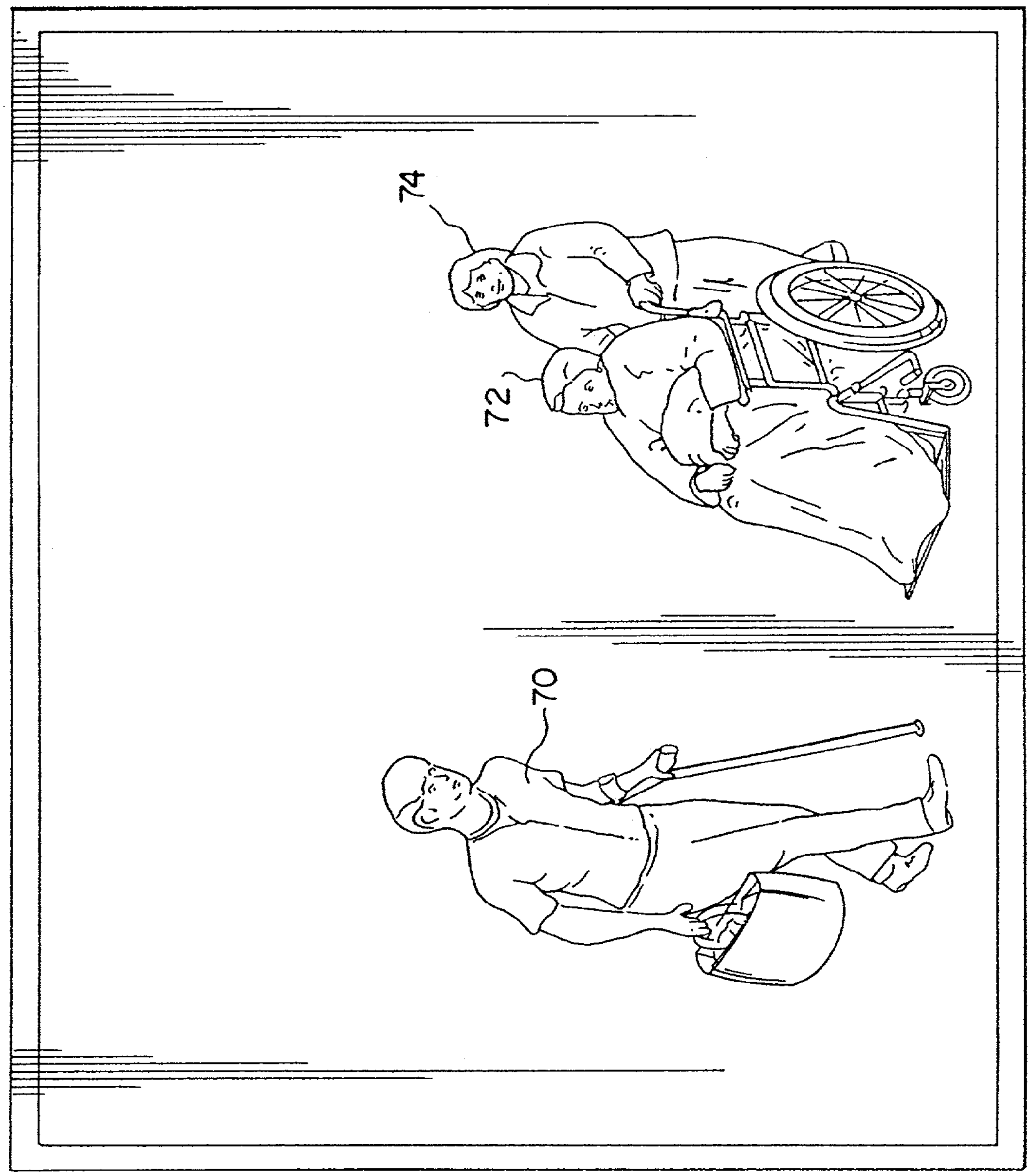
FIG. 4 is a drawing of an image of an elderly adult along with a disabled person being attended by a purported caregiver.

Alternatively, and referring to FIG. 4, the person susceptible to abduction may be an elderly person 70 or a disabled (mentally or physically) person 72. Likewise, these persons 70 or 72 would benefit from the apparatus and system of the present invention. In addition, the number of purported caregivers 74 or susceptible persons 14, 70 and/or 72 may be any given number, i.e., there can be any number of persons in a group. In which case and as described above, when entering the premise, the number of persons for the party or group would correspondingly be input into the dispenser 22.

A still further alternatively embodiment is to have the RF ID initiate image captures by the cameras 26 and 42 respectively upon entering and exiting the premise; the cameras 26 and 42 would obviously be modified to accept remote RF sensing. This would also mean that the signs 28 and 46 would be modified so that the group is informed that, before entering the image capture areas 30 and 48, they must be looking up so that facial features are captured.

Still further, instead of one image of the entire group, two or more images may be captured and stored in the database 38. In this case, the two or more images are stamped with a common reference (for example, a common number) by the camera 26; such stamping is well known in digital technology. The dispenser 22 is obviously modified to accept input of multiple images, and this information is sent to a microprocessor of the camera 26 which directs the capturing of multiple images and stamping of a common reference. This common reference is then sent to the database by the microprocessor for mating the two or more images together. For evidentiary purposes, if the common reference was somehow inadvertently or intentionally corrupted, a hardcopy image could be printed for retrieving the hardcopy images. Obviously, upon exiting, the mated images are compared to each other.

The invention has been described with reference to a preferred embodiment. However, it will be appreciated that variations and modifications can be effected by a person of ordinary skill in the art without departing from the scope of the invention.

PARTS LIST

10 premise
12 adult
14 child
16 building
18 doorway
20 post
22 dispenser
24 bracelets
26 camera
27 sensor
28 sign
30 indicator
32 button
34 cable
36 computer
38 database
40 exit
42 second camera
44 mechanism
45 mat sensor
46 second sign
48 second mark
50 cable
52 captured image
54 shopping bag
55 hair colors
56 hair texture
57 bald
58 clothing
60 clothing color
62 glasses
63 absence of glasses
64 hearing aids
66 braces
68 hats
70 elderly person
72 disabled person
74 purported caregiver

What is claimed is:

1. A method for preventing abduction of a person, the method comprising the steps of:

(a) capturing a first image of a first adult and a first person upon entering a premise;

(b) inputting the captured first image in a database;

(c) capturing a second image of a second adult and a second person upon exiting the premises; and (d) comparing the first and second images for predetermined characteristics for validating that the first adult associated with the first person in the first image is the same as the second adult associated with the second person in the second image.

2. The method as in claim 1, wherein step (d) includes comparing either individually or in any combination clothing color, hair color, absence or presence of glasses, absence or presence of hearing aids, absence or presence of a hat, and/or absence or presence of braces.

3. The method as in claim 1 further comprising the step of retrieving an identification indicator by the first adult or person upon entering the premises and associating the identification indicator with the captured image first adult and person.

4. The method as in claim 3 further comprising the step of retrieving the image associated with the identification indicator when manually or automatically prompted for the first image for the comparison of step (d).

5. The method as in claim 1, wherein the first person is a child, mentally challenged adult or elderly person.

6. A method for preventing abduction of a person, the method comprising the steps of:

(a) capturing a first image of a first adult and a second image of a first person upon entering a premise;

(b) correlating the first and second images for forming a mated pair of images;

(c) inputting the captured first and second images in a database;

(d) capturing a third image of a second adult and a fourth image a second person upon exiting the premises; and (e) comparing the first and second images with the third and fourth images for predetermined characteristics for validating that the first adult associated with the first child is the same as the second adult associated with the second child.

7. The method as in claim 6, wherein step (d) includes comparing either individually or in any combination clothing color, hair color, absence or presence of glasses, absence or presence of hearing aids, absence or presence of a hat, and/or absence or presence of braces.

8. The method as in claim 1 further comprising the step of retrieving an identification indicator by the first adult or person upon entering the premises and associating the identification indicator with both the captured image first adult and captured image of the first person.

9. The method as in claim 8 further comprising the step of retrieving both images associated the identification indicator when manually or automatically prompted respectively for the first and second images for the comparison of step (d).

10. The method as in claim 6, wherein the first person is a child, mentally challenged adult or elderly person.

* * * * *